United States Patent
Yao et al.

(10) Patent No.: US 12,401,409 B2
(45) Date of Patent: Aug. 26, 2025

(54) MULTIPLE PANEL TRANSMISSIONS IN WIRELESS COMMUNICATION SYSTEMS

(71) Applicant: ZTE Corporation, Guangdong (CN)

(72) Inventors: Ke Yao, Guangdong (CN); Bo Gao, Guangdong (CN); Shujuan Zhang, Guangdong (CN); Yang Zhang, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/532,973

(22) Filed: Dec. 7, 2023

(65) Prior Publication Data

US 2024/0106513 A1 Mar. 28, 2024

Related U.S. Application Data

(63) Continuation of application No. PCT/CN2022/090648, filed on Apr. 29, 2022.

(51) Int. Cl.
*H04B 7/06* (2006.01)
*H04L 5/00* (2006.01)

(52) U.S. Cl.
CPC ....... *H04B 7/06956* (2023.05); *H04L 5/0048* (2013.01)

(58) Field of Classification Search
CPC .............. H04B 7/0404; H04B 7/06956; H04B 7/0695; H04B 7/0628; H04B 7/0691; H04B 7/0602; H04B 7/061; H04B 7/0608; H04B 7/0604; H04B 7/0802; H04W 72/51; H04W 72/232; H04W 8/22; H04W 8/02
See application file for complete search history.

(56) References Cited

U.S. PATENT DOCUMENTS

2020/0177416 A1* 6/2020 Jiang ..................... H04L 5/0048
2020/0213979 A1* 7/2020 Chen .................... H04B 7/0617
2021/0273702 A1* 9/2021 Yang .................... H04B 7/0617
(Continued)

FOREIGN PATENT DOCUMENTS

WO  WO-2021151226 A1 * 8/2021 ........... H04B 7/0404
WO  2022031450 A1  2/2022
(Continued)

OTHER PUBLICATIONS

International Search Report and Written Opinion for International Application No. PCT/CN2022/090648, mailed on Dec. 27, 2022 (8 pages).
(Continued)

*Primary Examiner* — Sophia Vlahos
(74) *Attorney, Agent, or Firm* — Perkins Coie LLP

(57) ABSTRACT

Methods and systems related to using multiple panels for transmission in wireless communication systems are disclosed. The described embodiments advantageously enable wireless communication systems to efficiently operate in high-frequency bands. An example method of wireless communication includes determining, by a wireless device, at least one Sounding Reference Signal (SRS) resource set configured by a network node, one of the at least one SRS resource set comprising at least one SRS resource, and transmitting, by the wireless device to the network node, a transmission based on the at least one SRS resource set.

18 Claims, 5 Drawing Sheets

(56) References Cited

U.S. PATENT DOCUMENTS

| | | | |
|---|---|---|---|
| 2022/0086894 A1* | 3/2022 | Papasakellariou | H04L 5/0053 |
| 2022/0123799 A1 | 4/2022 | Varatharaajan et al. | |
| 2022/0322393 A1* | 10/2022 | Lin | H04L 5/0051 |
| 2023/0101753 A1* | 3/2023 | Khoshnevisan | H04L 5/0094 |
| | | | 370/329 |
| 2023/0189157 A1 | 6/2023 | Fan et al. | |
| 2023/0388076 A1* | 11/2023 | Yokomakura | H04L 5/0048 |

FOREIGN PATENT DOCUMENTS

| | | | | |
|---|---|---|---|---|
| WO | 2022032596 A1 | 2/2022 | | |
| WO | WO-2022208482 A1 * | 10/2022 | | H04B 7/0456 |
| WO | WO-2023135101 A1 * | 7/2023 | | H04B 7/0695 |
| WO | WO-2023151838 A1 * | 8/2023 | | H04B 7/0404 |
| WO | 2023/205995 A1 | 11/2023 | | |

OTHER PUBLICATIONS

Vivo, "Remaining issues on multi beam enhancement," 3GPP TSG RAN WG1 #107-e, e-Meeting, R1-2110990, Nov. 11-19, 2021, 27 pages.

Oppo, "Enhancements on Multi-Beam Operation," 3GPP TSG RAN WG1 #107-e, e-Meeting, R1-2111279, Nov. 11-19, 2021, 9 pages.

NTT Docomo, Inc., "Discussion on multi-beam operation," 3GPP TSG RAN WG1 #107-e, e-Meeting, R1-2112089, Nov. 11-19, 2021, 14 pages.

Fraunhofer IIS et al., "Remaining issues in enhancements on multi-beam operation," 3GPP TSG RAN WG1 Meeting #108-e, R1-2201425, E-meeting, Feb. 21-Mar. 3, 2022 (9 pages).

LG Electronics, "Enhancements on Multi-beam Operation," 3GPP TSG RAN WG1 #107-e, R1-2111453, e-Meeting, Nov. 11-19, 2021 (12 pages).

Samsung (Moderator), "Summary of offline discussion on unified TCI, inter-cell beam management, and MPUE," 3GPP TSG RAN WG1 #107-e, R1-2111716, e-Meeting, Nov. 11-19, 2021 (31 pages).

Samsung, "Other Potential Enhancements for Rel-17 Multi-beam," 3GPP TSG RAN WG1#108-e, R1-2202003, e-Meeting, Feb. 21-Mar. 3, 2022 (9 pages).

CATT, "Discussion on remaining issues on Rel-17 multi-beam operation," 3GPP TSG RAN WG1 #108-e, R1-2201328, e-Meeting, Feb. 21-Mar. 3, 2022 (9 pages).

Mediatek, Inc., "Enhancement on multi-beam operation," 3GPP TSG RAN WG1 #107-e, R1-2112276, e-Meeting, Nov. 11-19, 2021 (18 pages).

Qualcomm Inc., "Enhancements on Multi-beam Operation," 3GPP TSG RAN WG1 Meeting #109-e, R1-2204976, May 9-May 20, 2022 (13 pages).

Samsung (Moderator), "Moderator summary#4 for multi-beam enhancement: Round 3," 3GPP TSG RAN WG1 #107-e, R1-2112763, e-Meeting, Nov. 11-19, 2021 (8 pages).

ZTE, "Remaining issues on multi-beam enhancements," BGPP TSG RAN WG1 Meeting #108-e, R1-2201185, e-Meeting, Feb. 21-Mar. 3, 2022 (18 pages).

Intel Corporation, "Enhancements to Multi-Beam Operation," BGPP TSG RAN WG1 #108-e, R1-2201682, e-Meeting, Feb. 21-Mar. 3, 2022 (12 pages).

Extended European Search Report for European Patent Application No. 229393756, mailed Jan. 24, 2025 (11 pages).

* cited by examiner

1

MULTIPLE PANEL TRANSMISSIONS IN WIRELESS COMMUNICATION SYSTEMS

CROSS-REFERENCE TO RELATED APPLICATIONS

This application is a continuation of and claims priority to International PCT Application No. PCT/CN2022/090648, filed Apr. 29, 2022, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Methods and systems related to using multiple panels for transmission in wireless communication systems are disclosed. The described embodiments address, inter alia, the issue that a user equipment (UE) cannot recommend a preferred panel entity via UE capability value set ID reporting, the issue that the downlink control indication (DCI) overhead is not optimized when panel switching is enabled, and the issue that currently the sounding reference signal (SRS) resource or SRS resource set is not indicated from or associated with configured SRS resource sets based on associated phase tracking reference signal (PTRS) ports or an associated channel state information (CSI)-reference signal (RS).

In an example aspect, a method for wireless communication includes determining, by a wireless device, at least one Sounding Reference Signal (SRS) resource set configured by a network node, wherein one of the at least one SRS resource set comprises at least one SRS resource, and transmitting, by the wireless device to the network node, a transmission based on the at least one SRS resource set.

In another example aspect, a method for wireless communication includes configuring, by a network node, at least one Sounding Reference Signal (SRS) resource set, wherein one of the at least one SRS resource set comprises at least one SRS resource, and receiving, by the network node from a wireless device, a transmission based on the at least one SRS resource set.

In yet another example aspect, the above-described methods are embodied in the form of processor-executable code and stored in a non-transitory computer-readable storage medium. The code included in the computer readable storage medium when executed by a processor, causes the processor to implement the methods described in this patent document.

In yet another example embodiment, a device that is configured or operable to perform the above-described methods is disclosed.

The above and other aspects and their implementations are described in greater detail in the drawings, the descriptions, and the claims.

DETAILED DESCRIPTION

Figure 1:
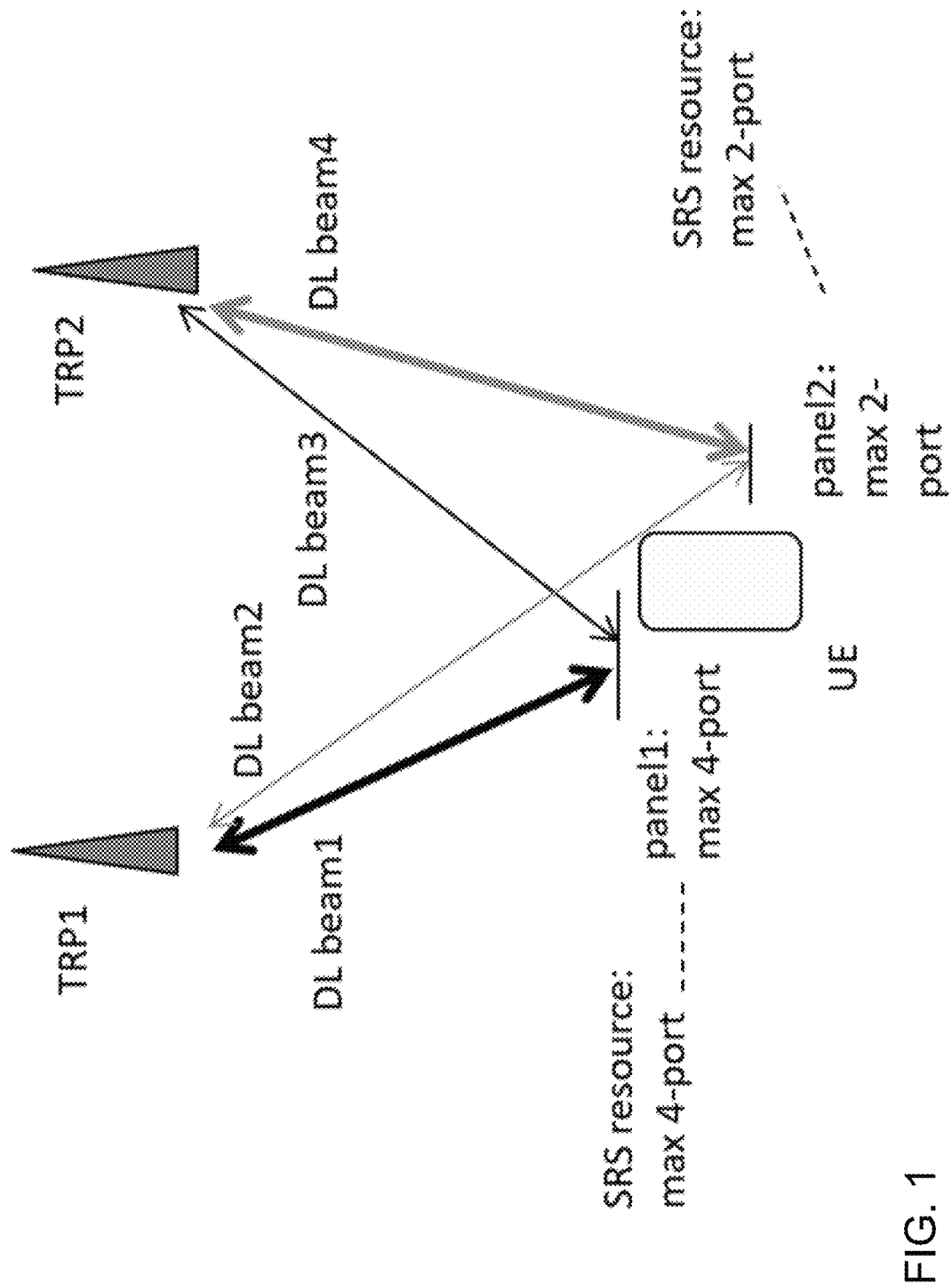
FIG. 1 shows an example of a user equipment (UE) configuration that supports two panels, each supporting a different maximum number of ports.

One of the key features of the New Radio (NR) technology of the Fifth Generation (5G) mobile communication systems is the support of high frequency bands. High frequency bands have abundant frequency-domain resources, but wireless signals in high frequency bands decay quickly and significantly limits the coverage of the wireless signals operating in those bands. To mitigate these adverse effects, transmitting signals in a beam mode that is able to concentrate energy in a relatively small spatial range is implemented, which improves the coverage of the wireless signals in the high frequency bands.

Example headings for various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Example Embodiments for UE Panel Activation and Selection

Overview. To facilitate UE-initiated panel activation and selection, the UE can report a list of UE capability values (or capability value sets). The UE capability value can be identified by a capability index or a capability value index. In an example, each UE capability value set includes the maximum supported number of Sounding Reference Signal (SRS) ports, and any two capability values sets are different. In the following descriptions, a UE capability value set can be replaced by a UE capability value, and a UE capability value set can include one or more UE capability values.

To facilitate UE-initiated panel activation and selection based on the UE reporting a list of UE capability value sets, the correspondence between each reported Channel State Information (CSI)-Reference Signal (RS) and/or Synchronization Signal Block (SSB) resource index and one of the UE capability value sets in the reported list is determined by the UE and is informed to network node (denoted NW) in a beam reporting instance. In this scenario, the UE can report one index of UE capability value set for each reported CSI-RS Resource Indicator (CRI)/SS-PBCH Block Resource Indicator (SSBRI) in one beam reporting. In an example, the index of corresponding UE capability value set is reported along with the pair of SSBRI/CRI and L1-Reference Signal Received Power (RSRP)/Signal-to-Interference plus Noise Ratio (SINR) in the beam reporting Uplink Control Information (UCI).

In these scenarios, with the reported index of UE capability value set for each reported CRI/SSBRI in one beam reporting, the network node could configure, activate, or indicate SRS resources or SRS resource sets based on the reported index of UE capability value set for UL transmission, e.g., for SRS transmissions or for Physical Uplink Shared Channel (PUSCH)/Physical Uplink Control Channel (PUCCH) transmissions. The number of ports corresponding to a reported index of UE capability value set can be configured to be equal to or greater than the maximum number of ports corresponding to the (configured, activated, or indicated) SRS resources or SRS resource sets.

FIG. 1 shows an example of a user equipment (UE) configuration that supports two panels, each supporting a different maximum number of ports. As shown therein, the UE supports 2 panels, where panel 1 corresponds to maximum 4-port and panel 2 corresponds to a maximum 2-port. In this scenario the UE can report two UE capability value sets corresponding to the maximum supported number of SRS ports, i.e., 4 and 2 respectively. Then the UE can report one index of a UE capability value set for each reported CRI/SSBRI in one beam reporting. This implies that one or both of the two UE capability value sets can be reported. If UE decides to turn off one panel, it can report only one UE capability value set corresponding to the other panel in a beam reporting. In this manner, the network node can receive the recommended panel information from the UE.

Technical problem. As discussed above, panel switching can be realized among different panels with different types of panels (e.g., with different maximum supported number of ports). However, if the UE is equipped with two panels with same maximum supported number of ports, e.g., 4 ports, the UE can only report one UE capability value set, which can be interpreted as a type of panel. Thus, the UE cannot recommend a preferred panel entity via UE capability value set ID reporting.

Technical solutions. In a first solution, more than one UE capability value set may have same maximum supported number of ports, with each UE capability set corresponding to an SRS resource or an SRS resource set. Panels with same maximum supported number of ports can be switched by the UE reporting different UE capability set IDs.

In a second solution, one UE capability set can correspond to one or more SRS resources or SRS resource sets such that each SRS resource or SRS resource set corresponds to a panel. In this scenario, an indication of the SRS resource or the SRS resource set corresponding to the recommended panel can be reported, e.g., in addition to the reported UE capability value set ID or instead of the reported UE capability value set ID.

In some embodiments, at least one of the following parameters can be reported for each UE capability set, e.g., to provide information for network node configuration or indication related to SRS:

A number of SRS resource sets corresponding to a UE capability set.

For example, multiple SRS resource sets can correspond to a UE capability set, and each SRS resource set can correspond to a panel or a panel group. If this parameter is not reported or provided, it is assumed one SRS resource set corresponds to one UE capability set.

A number of SRS resources corresponding to a UE capability set.

For example, multiple SRS resources can correspond to a UE capability set, and each SRS resource corresponds to a panel or panel group. In some embodiments, each UE capability set corresponds to an SRS resource set. The number of SRS resources corresponding to a UE capability set may be the number of SRS resources in the SRS resource set corresponding to the UE capability set. Alternatively, the number of SRS resources corresponding to a UE capability set may be the number of SRS resources with the given number of ports in the SRS resource set corresponding to the UE capability set, where the given number of ports is determined according to the maximum supported number of ports related to the UE capability set. In some embodiments, the given number of ports can be equal to the maximum supported number of ports related to the capability set.

E.g., for a UE capability set with a maximum supported number of ports equal to 4, SRS resource sets comprising 2 SRS resources are configured, wherein each SRS resource is configured with 4 ports.

E.g., for a UE capability set with a maximum supported number of ports equal to 4, SRS resource sets comprising 4 SRS resources are configured. Herein, 2 SRS resources are configured with 4 ports, and 2 SRS resources are configured with fewer than 4 ports, e.g., 1 port or 2 ports. The number of SRS resources with same number of ports in the SRS resource set should not be larger than the number of SRS resources corresponding to a UE capability set. This may be needed for full power mode cases.

If this parameter is not reported or provided, it is assumed that one SRS resource corresponds to one UE capability set. In other words, one SRS resource in an SRS resource set corresponds to one UE capability set.

A maximum number of layers of PUSCH corresponding to a UE capability set.

For example, for an SRS resource set with a maximum number of ports equal to 4, 2 SRS resources in the SRS resource set can be co-scheduled for PUSCH transmission, which results in at most a total of 8 ports. Herein, the maximum number of layers of PUSCH can be less than 8, e.g., 6, 4, etc. If this parameter is not reported or provided, it is assumed that the maximum number of layers of PUSCH corresponding to a UE capability set can be the maximum supported number of ports of the UE capability set, or can be the sum of the number of ports of the SRS resources for simultaneous PUSCH transmission.

A maximum number of SRS resource sets configured or scheduled for PUSCH transmission corresponding to a UE capability set.

For example, if the number of SRS resource sets corresponding to a UE capability set is larger than 1, e.g., 2, 4, or 8, a maximum number of SRS resource sets scheduled for PUSCH corresponding to the UE capability set can be reported, such as e.g., 1, 2, 4, or 8.

For example, the maximum number of SRS resource sets scheduled for PUSCH transmission corresponding to a UE capability set may refer to the maximum number of SRS resource sets scheduled for one PUSCH transmission, more than one simultaneous PUSCH transmissions, more than one (fully or partially overlapped) time-domain PUSCH transmission, or more than one time-domain multiplexed (TDMed) PUSCH transmission.

If this parameter is not reported or provided, it is assumed the maximum number of SRS resource sets configured or scheduled for PUSCH transmission corresponding to a UE capability set can be 1 or the number of SRS resource sets corresponding to a UE capability set.

A maximum number of SRS resources configured or scheduled for PUSCH transmission corresponding to a UE capability set.

For example, in the case that a number of SRS resources corresponding to a UE capability set is greater than 1, e.g., 2, 4, or 8, a maximum number of SRS resources scheduled for PUSCH corresponding to the UE capability set can be reported, such as e.g., 1, 2, 4, or 8.

For example, the maximum number of SRS resources scheduled for PUSCH transmission corresponding to a UE capability set may refer to the maximum number of SRS resource sets scheduled for one PUSCH transmission, more than one simultaneous PUSCH transmissions, more than one (fully or partially overlapped) time-domain PUSCH transmission, or more than one time-domain multiplexed (TDMed) PUSCH transmission.

If this parameter is not reported or provided, it is assumed that the maximum number of SRS resources configured or scheduled for PUSCH transmission corresponding to a UE capability set can be 1 or the number of SRS resources corresponding to a UE capability set.

A full power mode indication corresponding to a UE capability set.

A coherent type indication corresponding to a UE capability set

A number of PTRS ports corresponding to a UE capability set, a number of PTRS ports corresponding to all UE capability sets, and/or one or more UE capability sets sharing a PTRS port.

In some embodiments, at least one of the following parameters can be reported for a scheduling of a PUSCH transmission across all of the reported UE capability sets:

A maximum number of SRS resource sets

For example, multiple SRS resource sets can correspond to same or different UE capability sets, and each SRS resource set corresponds to a panel or a panel group. If this parameter is not reported or provided, it is assumed that a predefined value, e.g., 1 or 2, of SRS resource sets can be used for scheduling of PUSCH, or any number of SRS resource sets can be used for scheduling of PUSCH.

A maximum number of SRS resources

For example, multiple SRS resources can correspond to same or different UE capability sets, and each SRS resource corresponds to a panel or a panel group. If this parameter is not reported or provided, it is assumed that a predefined value, e.g., 1 or 2, of SRS resources can be used for scheduling of PUSCH, or any number of SRS resources can be used for scheduling of PUSCH.

A maximum number of layers of PUSCH

For example, a maximum number of layers of PUSCH across all of the reported UE capability sets. If this parameter is not reported or provided, it is assumed that the maximum number of layers of PUSCH for all UE capability sets can be the maximum supported number of ports for one UE capability set, the minimal value of the maximum supported numbers of ports for all UE capability sets, or the sum of the number of ports of the SRS resources for simultaneous PUSCH transmissions.

An application of the aforementioned technical solutions is the determination of the maximum number of layers of PUSCH for a given scheduling based on at least one of:

The recommended UE capability value set index, e.g., a maximum supported number of SRS ports for the recommended UE capability value set index;

The recommended SRS resource or SRS resource set, e.g., a maximum supported number of SRS ports for the recommended SRS resource or SRS resource set;

A maximum number of layers of PUSCH for the recommended UE capability value set index; or A maximum number of layers of PUSCH for a scheduling of PUSCH transmission across all of the reported UE capability sets.

For example, the maximum number of layers of PUSCH for a given scheduling can be determined based on the minimum value between a number of SRS ports and a number of layers. E.g., assuming the maximum supported number of SRS ports for UE capability value set index 1 is 4, and a maximum number of layers of PUSCH for a scheduling of PUSCH transmission across all of the reported UE capability sets is 2, then the max number of layers of PUSCH for a given scheduling can be determined as 2.

In some embodiments, the number of recommended UE capability value set index, the recommended SRS resource, or the recommended SRS resource set can be greater than 1, if more than one of the recommended UE capability value set index, recommended SRS resource, or recommended SRS resource set can be scheduled for simultaneous UL transmission. In this case, the value of the number of SRS ports or the number of layers per recommended UE capability value set index, recommended SRS resource, or recommended SRS resource set can be set to their sum, instead of one value per parameter. E.g., assuming the maximum supported numbers of SRS ports for UE capability value set indexes 1 and 2 are 4 and 2, respectively, the UE capability value set indexes 1 and 2 are reported as 6 (the sum of 4 and 2), which is used to determine the maximum number of layers of PUSCH for a given scheduling.

In some embodiments, the above parameters can be reported separately or can be jointly reported. In the case of a joint report, a UE capability mode index is reported by the UE to the network node. The capability mode index indicates one value for an entry from a predefined parameter (or parameter combination) table (or list). Herein, each entry corresponds to predefined value(s) for one or more of the above parameters.

In an example, and as shown in the table below, Parameter #1, Parameter #2, and Parameter #3 can be a maximum number of SRS resource sets, a maximum number of SRS resources, and a maximum number of layers of PUSCH, respectively. For the first entry with capability mode index 0, Value 0_1, Value 0_2, and Value 0_3 for Parameter #1, Parameter #2, and Parameter #3 can be 1, 2, and 4, respectively.

| capability mode index | Parameter #1 | Parameter #2 | Parameter #3 | ... |
|---|---|---|---|---|
| 0 | Value 0_1 | Value 0_2 | Value 0_3 | ... |
| 1 | Value 1_1 | Value 1_2 | Value 1_3 | ... |

| capability mode index | Parameter #1 | Parameter #2 | Parameter #3 | ... |
|---|---|---|---|---|
| 2 | Value 2_1 | Value 2_2 | Value 2_3 | ... |
| ... | ... | ... | ... | ... |

The number of parameters for each entry and/or the number of entries in the table can be predefined or can be extendable in the future.

In another example, for each entry, the parameters can include at least one of:
- A total number of ports across SRS resources configured in a SRS resource set, e.g., a sum of numbers of ports across the SRS resources
- A total number of ports across SRS resources for a given PUSCH transmission scheduling
- A maximum number of ports in an SRS resource
- A maximum number of layers for a given PUSCH transmission scheduling
- A maximum number of spatial relations for a given UL transmission
- A maximum number of TCI states for a given UL transmission
- A number or a maximum number of SRS resources for a given PUSCH transmission scheduling
- A number or a maximum number of SRS resource set for a given PUSCH transmission scheduling
- A coherent type for an SRS resource, an SRS resource set, or a UE capability value set As referred to herein, a UE capability value or UE capability value set can be reported per group in a group based beam report instance, e.g., from UE to NW. In some embodiments, a UE capability mode index can be reported per group in a group based beam report instance, e.g., from UE to NW.

As referred to herein, a "group" refers to a group of reported CRI/SSBRI in one beam reporting. In some embodiments, and among the reported CSI/SSBRI in a group, each reported CSI/SSBRI corresponds to respective CSI/SSBRI sets, e.g., for different TRPs.

As referred to herein, "panel switching" is equivalent to panel mode switching.

As referred to herein, a "panel mode" is equivalent to one panel or a combination of panels. In some embodiments, a panel is equivalent to a panel entity. In some embodiments, a panel is equivalent to a set of antennas or antenna units.

Example Embodiments for Reducing DCI Overhead

Overview. To facilitate UE-initiated panel activation and selection, the UE can report a list of UE capability value sets, and the correspondence between each reported CSI-RS and/or SSB resource index and one of the UE capability value sets in the reported list is determined by the UE and is informed to NW in a beam reporting instance. The reported index of UE capability value set reported for the correspondence is also referred as recommended index of UE capability value sets. The recommended index of UE capability value set reflects preference of panel entity from UE perspective, e.g., corresponding to active panel entity, or for other reasons.

In an example, when the UE capability value set is reported by a UE, NW can configure one or more SRS resources sets, each of which comprises one or more SRS resources, according to reported UE capability value sets, e.g., to reflect reported UE capability value sets.

In an example, when the UE capability value set(s) index is recommended by a UE, the NW can update the SRS configuration, or indicate SRS for UL transmission according to the recommended UE capability value set index, e.g., to reflect the recommended UE capability value sets.

Technical problem. In the framework described above, the overhead of some downlink control information (DCI) fields should be predetermined as fixed value or the DCI overhead can be reduced for panel switching.

(1) The bit size of DCI fields for different UE capabilities may be different, e.g., for precoding information and number of layers field, and thus, the bit size of DCI fields should be determined as a fixed value.

(2) To support panel switching, via SRS resource set switching, an SRS resource set indicator field may be needed, and some fields e.g., second precoding information and number of layers field may, second TPC command, may not be needed.

Technical solution. In some embodiments, the network node configures more than one SRS resource set for a UE, and each SRS resource set corresponds to a UE capability value set. The bit size of DCI fields, e.g., precoding information and number of layers field, should be determined according to a maximum value among the SRS ports for all the configured SRS resource sets. In an example, the following cases are considered:

If only panel switching is determined as enabled, SRS resource set indicator field is present, and the bit size of SRS resource set indicator field is 1.

If only panel switching is determined as enabled, the bit size of SRS resource indicator field is determined based on a maximum value among the SRS ports for all the configured SRS resource sets codebook or non-codebook usage.

If only panel switching is determined as enabled, at least one of the second SRS resource indicator field, the second precoding information, the second PTRS-DMRS association, or the second TPC command for scheduled PUSCH, is absent. Alternatively, the bit size for these fields can be determined as zero.

In some embodiments, and for codebook-based PUSCH, the SRS resource indicator can indicate more than one SRS resource. In an example, the more than one SRS resource can be used to determine a transmit parameter for a PUSCH transmission or simultaneous PUSCH transmissions. In another example, the more than one SRS resource can share a set of precoding information indication, i.e., TPMI. Herein, the rank for the precoding information is determined as maximum value among the rank indications for the indicated SRS resources.

In some embodiments, this function can be enabled by RRC signaling, or can be enabled if at least one of the following conditions are satisfied: the UE supports more than one SRS resource for a UE capability value set or the more than one SRS resource can support simultaneous transmission.

For example, assuming SRS resource 1 is configured with 4 ports, SRS resource 2 is configured with 4 ports, rank value for SRS resource 1 is 3, and rank value for SRS resource 1 is 2, then the precoding information can be (a) a 4-dimensional vector with additional information for more vectors for the second layer and third layer, or (b) a matrix with 4 rows for 4 ports and 3 columns for 3 layers, wherein SRS resource 1 corresponds to the 3 layers, and SRS resource 2 corresponds to the 2 layers, e.g., the first 2 layers among the 3 layers.

In some embodiments, and for codebook-based PUSCH, SRS resource set indicator can indicate more than one SRS resource set. In an example, the more than one SRS resource in the more than one SRS resource set can be used to determine transmit parameter for a PUSCH transmission or simultaneous PUSCH transmissions. In another example, the more than one SRS resource can share a set of precoding information indication, i.e., TPMI. Herein, the rank for the precoding information is determined as maximum value among the rank indications for the indicated SRS resources.

In some embodiments, this function can be enabled by RRC signaling, or can be enabled if at least one of the following conditions are satisfied: UE supports more than one SRS resource set for a UE capability value set or the more than one SRS resource set can support simultaneous transmission.

Example Embodiments for Flexible UL/DL Reference Signal Resources

In some embodiments, Radio Resource Control (RRC) configuration may be based on maximum capability, but SRS/CSI-RS resources that are related to an inactive panel may not need to be transmitted and/or received based on dynamic panel mode switching.

In an example where only one SRS resource set is available for conjugate beamforming (CB)/normalized CB (NCB) for panel 1 and panel 2 (for one TRP), which includes 2 SRS resources for each panel, which SRS resource is transmitted when the SRS resource set is triggered depends on the panel mode switching mode.

Scheme 1. Use a panel-specific capability such that an inactive panel can be determined per panel and the corresponding SRS resource (active panel) remains.
  Scheme 2. Use a panel-type capability such that an inactive panel can be determined by the number of panels and only the lowest ID of the SRS resource remains.

Example Embodiments for Indicating or Associating SRS Resource Sets

In some embodiments, a UE reports its panel related capability to a NW, e.g., using a UE capability value set, and the NW configures parameters, such as an SRS resource or SRS resource set, according to the panel related capability reported by the UE or according to a panel related capability configured by NW based on the panel related capability reported by the UE.

In some embodiments, the UE may report more than one panel entity.

A UE can be configured, e.g., by a NW via RRC signaling, m0, which is at most M0, SRS resource sets, where M0 is an integer, e.g., 1, 2, 4, or 8, for the UE.
  A UE can be activated, e.g., by a NW via MAC CE, m1, which is at most M1, SRS resource sets from the M0 configured SRS resource sets, where M1 is an integer, e.g., 1, 2, or 4. M1 is equal to or less than M0.
  A UE can be indicated, e.g., by a NW via DCI signaling, m2, which is at most M2, SRS resource sets from the m0 configured SRS resource sets, or from the m1 activated SRS resource sets, where M2 is an integer, e.g., 1, 2, or 4. M2 is equal to or less than M0 or M1.
  A UE can be indicated, e.g., by a NW via DCI signaling, m2 or M2 SRS resource indicators (SRIs) to indicate at least m2 SRS resources. Each SRI corresponds to an SRS resource set, or is reserved for an SRS resource set.

In these scenarios, M0, M1, or M2 can be determined as a predefined way, according to reported UE capability, or according to configuration from NW, e.g., subject to UE capability.

In an example, a UE is configured by a NW M0=8 SRS resource sets, and M1=2 SRS resource sets are activated by a MAC CE, then M2=1, or 2 SRS resources sets from M1=2 activated SRS resource sets are indicated by a DCI.

In another example, a UE is configured by a NW M0=8 SRS resource sets, then M2=1, or 2 SRS resources sets from M0=8 configured SRS resource sets are indicated by a DCI.

In some embodiments, a UE can be configured with PTRS (also referred as PT-RS) with one or more PT-RS ports which can be identified by a PTRS port index. A UE can be configured or associated with the PTRS port index for each configured SRS resource or SRS resource set. If the PTRS port index associated with different SRIs are the same, the corresponding UL DM-RS ports are associated to the one UL PT-RS port. The usage for the SRS resource or SRS resource set comprises codebook, non-codebook, or antenna switching.

In some embodiments, a UE can be configured with CSI-RS for each configured SRS resource set. The usage for the SRS resource or SRS resource set comprises codebook, non-codebook, or antenna switching.

Scheme 1. In some embodiments, a UE can be activated or indicated m2, e.g., m2=2, SRS resource sets according to PTRS port index associated with an SRS resource or an SRS resource set. Further at least one of the following rules can be applied:
    Each SRS resource set can be associated with a PTRS port index. Alternatively, an SRS resource set can be determined a PTRS port index based on PTRS port index associated with an SRS resource in the SRS resource set. Herein, all SRS resources in the SRS resources set are associated with a same PTRS port index.
    The PTRS port index associated with one indicated SRS resource set should be different from PTRS port index associated with another indicated SRS resource set.
    The PTRS port index associated with one activated SRS resource set should be different from PTRS port index associated with another activated SRS resource set.
    The CSI-RS associated with one indicated SRS resource set should be different from CSI-RS associated with another indicated SRS resource set.
    The CSI-RS associated with one activated SRS resource set should be different from CSI-RS associated with another activated SRS resource set.
  Scheme 2. In some embodiments, an SRI corresponding to an SRS resource set is determined based on a PTRS port index associated with an SRS resource in the SRS resource set.
    The SRS resources in an SRS resource set can be grouped to at least one SRS resource subset according to PTRS port index associated with the SRS resources. E.g., SRS resources in an SRS resource subset are associated with a same PTRS port index.
    The SRI can indicate at most N1 SRS resources. Each SRS resource corresponds to a respective SRS resource subset. Herein, N1 is equal to or less than the number of PTRS ports associated with the SRS resources in the SRS resource set, e.g., N0, with N0 and N1 being integers.

For example, and as shown in Table 1 below, an SRS resource set comprising 4 SRS resources are configured for a UE. SRS resources 1 and 2 are associated with PTRS port index 1, and SRS resources 3 and 4 are associated with PTRS port index 2. Thus, SRS resources 1 and 2 are in SRS resources subset 1, and SRS resources 3 and 4 are in SRS resources subset 2. As shown in Table 2, SRI can indicate at least one SRS resource, and each of the at least one SRS resource belongs to a respective SRS resource subset.

In some embodiments, a PTRS port associated with a SRS resource indicated by one SRI is not same as PTRS port associated with any SRS resource indicated by another SRI, e.g., in the case that more than one SRI are indicated for simultaneous transmission.

TABLE 1

| SRS resource set index | SRS resource index | PTRS port index | SRS resource subset index |
|---|---|---|---|
| SRS resource set 1 | SRS resource 1 | PTRS port index 1 | SRS resource subset 1 |
|  | SRS resource 2 | PTRS port index 1 | SRS resource subset 1 |
|  | SRS resource 3 | PTRS port index 2 | SRS resource subset 2 |
|  | SRS resource 4 | PTRS port index 2 | SRS resource subset 2 |

TABLE 2

| SRI value | SRS resource subset 1 | SRS resource subset 2 |
|---|---|---|
| 0 | SRS resource 1 | null |
| 1 | SRS resource 2 | null |
| 2 | null | SRS resource 3 |
| 3 | null | SRS resource 4 |
| 4 | SRS resource 1 | SRS resource 3 |
| 5 | SRS resource 1 | SRS resource 4 |
| 6 | SRS resource 2 | SRS resource 3 |
| 7 | SRS resource 2 | SRS resource 4 |

For the PTRS port based SRS resource grouping method described above, the overhead of SRI can be reduced. As shown in Table 2, only 3 bits are needed, compared with 4 bits (4 entries for SRI values indicating 1 SRS resource, 6 entries for SRI values indicating 2 SRS resources, 4 entries for SRI values indicating 2 SRS resources, and/or 1 entry for 4 SRS resources) that are needed without the SRS resource grouping method.

Example Implementations of the Disclosed Technology

Figure 2:
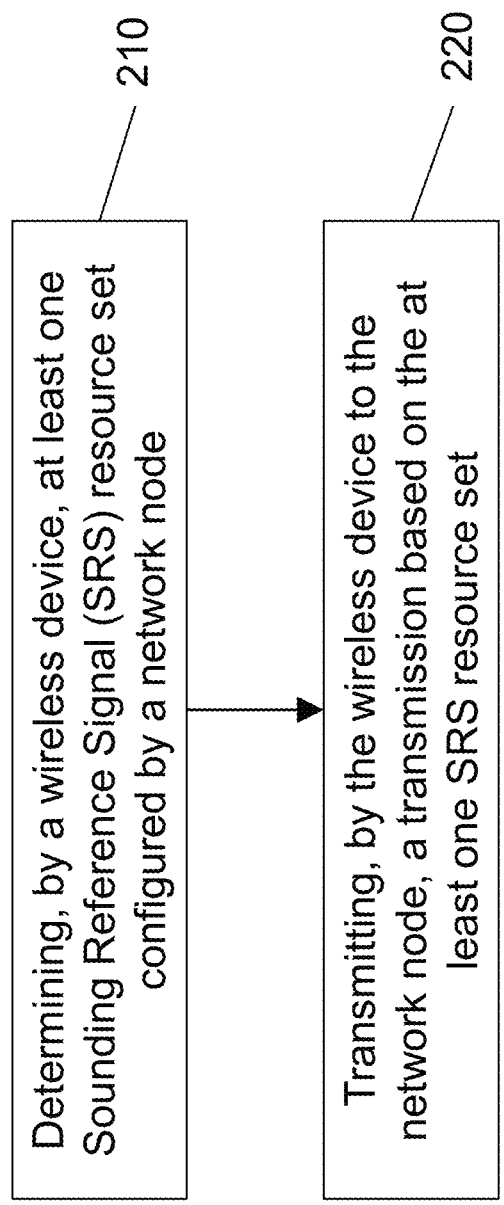
FIG. 2 shows an example flowchart for a method of wireless communication.

FIG. 2 shows a flowchart of an example method 200 of wireless communication. The method 200 includes, an operation 210, determining, by a wireless device, at least one Sounding Reference Signal (SRS) resource set configured by a network node, one of the at least one SRS resource set comprising at least one SRS resource.

The method 200 includes, an operation 220, transmitting, by the wireless device to the network node, a transmission based on the at least one SRS resource set.

Figure 3:
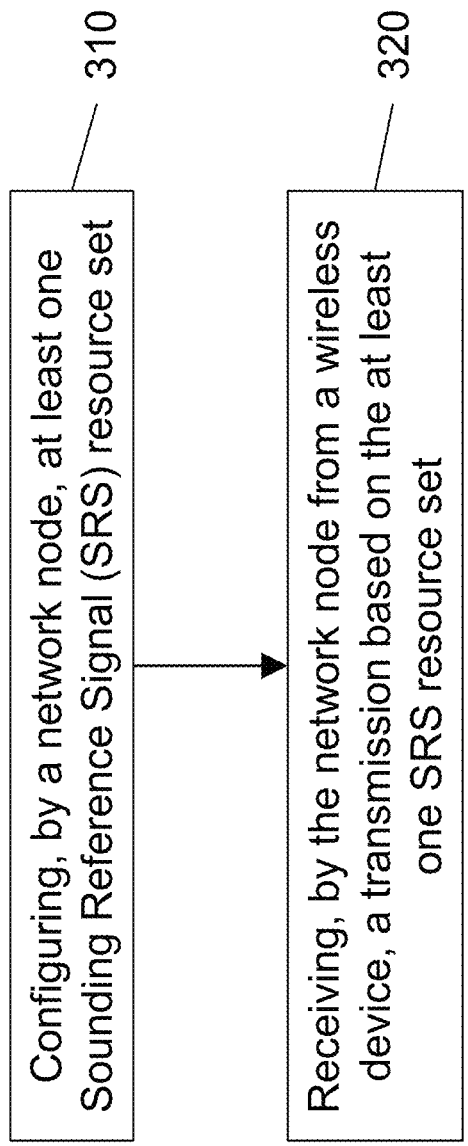
FIG. 3 shows an example flowchart for another method of wireless communication.

FIG. 3 shows a flowchart of an example method 300 of wireless communication. The method 300 includes, an operation 310, configuring, by a network node, at least one Sounding Reference Signal (SRS) resource set, one of the at least one SRS resource set comprising at least one SRS resource.

The method 300 includes, an operation 320, receiving, by the network node from a wireless device, a transmission based on the at least one SRS resource set.

The disclosed embodiments provide, inter alia, the following technical solutions to solve the problems described in this document.

1. A method of wireless communication, comprising determining, by a wireless device, at least one Sounding Reference Signal (SRS) resource set configured by a network node, wherein one of the at least one SRS resource set comprises at least one SRS resource, and transmitting, by the wireless device to the network node, a transmission based on the at least one SRS resource set. In some embodiments, the transmission comprises an uplink transmission, e.g., PUSCH, PUCCH, SRS, etc.

2. The method of solution 1, further comprising reporting, by the wireless device to the network node, at least one capability value set, at least one first parameter, or at least one second parameter, wherein one of the at least one first parameter is comprised in or corresponds to one of the at least one capability value set, and wherein one of the at least one second parameter corresponds to an uplink (UL) transmission or a scheduling of one or more UL transmissions. In some embodiments, the first parameter is a capability value set—level parameter. In other embodiments, the first parameter is a capability value.

3. The method of solution 1, further comprising receiving, by the wireless device from the network node, at least one capability value set, at least one first parameter, or at least one second parameter, wherein one of the at least first parameter is comprised in or corresponds to one of the at least one capability value set, and wherein one of the at least second parameter corresponds to an uplink (UL) transmission or a scheduling of one or more UL transmissions. In some embodiments, the capability value set reported by the wireless device to the network node (as recited in claim 2) is different from the capability value set received by the wireless device from the network node. In some embodiments, a scheduling of the one or more UL transmissions corresponds to the scheduling information being carried in downlink control information (DCI).

4. The method of solution 2 or 3, wherein the at least one SRS resource or the at least one SRS resource set is based on the at least one capability value set.

5. A method of wireless communication, comprising configuring, by a network node, at least one Sounding Reference Signal (SRS) resource set, wherein one of the at least one SRS resource set comprises at least one SRS resource, and receiving, by the network node from a wireless device, a transmission based on the at least one SRS resource set.

6. The method of solution 5, further comprising receiving, by the network node from the wireless device, at least one capability value set, wherein the configuring is based on the at least one capability value set.

7. The method of solution 2 or 3, wherein one of the at least one capability value set corresponds to one or more SRS resource sets or one or more SRS resources. In some embodiments, one capability value set can be reflected by one SRS resource set, or more SRS resource sets, e.g., via NW configuration. In other embodiments, one capability value set can be reflected by one SRS resource, or more SRS resources, e.g., via NW configuration.

8. The method of any of solutions 1 to 3, further comprising at least one of reporting, by the wireless device to the network node, (a) at least one indication of the at least one SRS resource set or the at least one SRS resource or (b) at least one indication of a capability value set.

9. The method of solution 8, wherein the maximum number of layers of the PUSCH transmission is determined based on at least one of the at least one indication of the at least one SRS resource set or the at least one SRS resource, the at least one indication of a capability value set, a number or a maximum number of SRS ports corresponding to the at least one indication of the at least one SRS resource set or the at least one SRS resource, a number or a maximum number of SRS ports corresponding to the at least one indication of a capability value set, a number or a maximum number of layers corresponding to the at least one indication of the at least one SRS resource set or the at least one SRS resource, a number or a maximum number of layers corresponding to the at least one indication of a capability value set, a number or a maximum number of layers corresponding to a PUSCH transmission corresponding to (a) the at least one indication of a capability value set or (b) all reported or configured capability value sets. In some embodiments, the maximum number of layers of the PUSCH transmission is determined as a minimum value of at least one of the number or the maximum number of SRS ports corresponding to the at least one indication of the at least one SRS resource set or the at least one SRS resource, the number or the maximum number of SRS ports corresponding to the at least one indication of a capability value set, the number or the maximum number of layers corresponding to the at least one indication of the at least one SRS resource set or the at least one SRS resource, the number or the maximum number of layers corresponding to the at least one indication of a capability value set, the number or the maximum number of layers corresponding to the PUSCH transmission corresponding to (a) the at least one indication of a capability value set or (b) all the reported or configured capability value sets.

10. The method of solution 8, wherein one of the at least one indication of the at least one capability value set corresponds to one or a group of reported channel state information-reference signal (CSI-RS) resource indicators (CRI) or SS/PBCH block resource indicators (SSBRI) in one beam reporting.

11. The method of solution 8, wherein one of the at least one indication of the at least one SRS resource set or the at least one SRS resource corresponds to one or a group of reported channel state information-reference signal (CSI-RS) resource indicators (CRI) or SS/PBCH block resource indicators (SSBRI) in one beam reporting.

12. The method of solution 2 or 3, wherein the first parameter comprises a parameter corresponding to a capability value set related to the first parameter, and wherein the parameter is at least one of a number of SRS resource sets, a number of SRS resources, a maximum number of layers of a Physical Uplink Shared Channel (PUSCH) transmission, a maximum number of one or more SRS resource sets configured or scheduled for a PUSCH transmission, a maximum number of one or more SRS resources configured or scheduled for a PUSCH transmission, a number of phase tracking reference signal (PTRS) ports, a full power mode indication, or a coherent type indication.

13. The method of solution 2 or 3, wherein the second parameter comprises at least one of a number or a maximum number of SRS resource sets, a number or a maximum number of SRS resources, a number or a maximum number of layers, a total number of ports of one or more SRS resources corresponding to a PUSCH transmission, a maximum number of spatial relations related to one or more SRS resources corresponding to a PUSCH transmission, a maximum number of transmission configuration indicator (TCI) states related to one or more SRS resources corresponding to a PUSCH transmission, or a coherent type for an SRS resource or an SRS resource set corresponding to a PUSCH transmission.

14. The method of solution 12 or 13, wherein at least one of the first parameter, the second parameter, or a maximum number of ports in an SRS resource is reported as a capability mode index that indicates an entry from a predefined lookup table (LUT).

15. The method of solution 14, wherein an indication of the capability mode index is reported, and wherein the indication of the capability mode index corresponds to one or a group of reported channel state information-reference signal (CSI-RS) resource indicators (CRI) or SS/PBCH block resource indicators (SSBRI) in one beam reporting.

16. The method of solution 1, wherein up to a maximum of M0 of the at least one SRS resource sets are configured via Radio Resource Control (RRC) signaling, and wherein M0 is an integer.

17. The method of solution 16, wherein up to a maximum of M2 of the M0 configured SRS resource sets are indicated via Downlink Control Indication (DCI) signaling, and wherein M2 is an integer less than or equal to M0.

18. The method of solution 16, wherein up to a maximum of M1 of the M0 configured SRS resource sets are activated via a Medium Access Control (MAC) Control Element (CE), wherein M1 is an integer less than or equal to M0.

19. The method of solution 18, wherein up to a maximum of M2 of the M1 activated SRS resource sets are indicated via Downlink Control Indication (DCI) signaling, and wherein M2 is an integer less than or equal to M1.

20. The method of solutions 17 or 19, wherein at least m2 SRS resources are indicated via up to M2 SRS resource indicators (SRI), wherein m2 is an integer that is less than or equal to M2, and wherein each of the SRIs corresponds to an SRS resource set.

21. The method of solution 1, wherein up to a maximum of M2 of the at least one SRS resource sets are activated or indicated based on a phase tracking reference signal (PTRS) port index associated with the at least one SRS resource or the at least one SRS resource set.

22. The method of any of solutions 16 to 21, wherein the value of M0, M1, or M2 is determined as a predefined value, or according to a reported capability of the wireless device, or according to a configuration from the network node.

23. The method of solution 21, wherein each of the at least one SRS resource set is associated with a PTRS port index.

24. The method of solution 21, wherein a first PTRS port associated with a first indicated or activated SRS resource set is different from a second PTRS port associated with a second indicated or activated SRS resource set.

25. The method of solution 1, wherein an SRS resource indicator (SRI) corresponding to an SRS resource set of the at least one SRS resource set is determined based on a PTRS index associated with an SRS resource in the SRS resource set.

26. The method of solution 25, wherein the at least one SRS resource indicated by the SRI is associated with a same PTRS port index.

27. The method of solution 25, wherein a first PTRS port associated with a first SRS resource indicated by a first SRI is different from a second PTRS port associated with a second SRS resource indicated by a second SRI in response to the first SRI and the second SRI being configured for simultaneous transmission.

28. The method of solution 2 or 3, further comprising receiving, from the network node, a control information comprising at least one field, wherein a bit size of the at least one field is based on one or more of the at least one first parameter, the at least one second parameter, or the at least one capability value set.

29. The method of solution 28, wherein the control information comprises downlink control information (DCI) signaling.

30. The method of solution 29, wherein the at least one field comprises an SRS resource set indicator field, and wherein the bit size of the SRS resource set indicator field is set to 1 in response to panel switching being enabled. In some embodiments, the panel switching being enabled by RRC signaling or MAC CE signaling corresponds to only one panel operating at a time.

31. The method of solution 29, wherein the at least one field comprises an SRS resource indicator (SRI) field, wherein the bit size of the SRI field is based on a maximum value across numbers of SRS ports for a first group of SRS resource sets with codebook or non-codebook usage in response to panel switching being enabled, and wherein the first group of SRS resource sets is determined based on (a) the at least one of SRS resource set configured by the network node or (b) an indication of the at least one SRS resource set or the at least one SRS resource.

32. The method of solution 29, wherein the DCI signaling excludes at least one of the second SRI field, the second precoding information, the second PTRS-DMRS association, or the second TPC command for the scheduled PUSCH in response to panel switching being enabled.

33. The method of solution 29, wherein the bit size of the second SRI field, the second precoding information, the second PTRS-DMRS association, or the second TPC command for the scheduled PUSCH is zero in response to only panel switching being enabled.

34. The method of solution 29, wherein the DCI signaling comprises an SRS resource indicator (SRI) for a codebook-based Physical Uplink Shared Channel (PUSCH) transmission, and wherein the SRI indicates more than one SRS resource.

35. The method of solution 34, wherein a transmit parameter for the PUSCH transmission or simultaneous PUSCH transmissions is based on the more than one SRS resource.

36. The method of solution 34, wherein each SRS resource of the more than one SRS resource corresponds to a set of precoding information indications. In some embodiments, each SRS resource of the more than one SRS resource corresponding to the set of precoding information indications corresponds to the same set of precoding information being shared by the more than one SRS resource.

37. The method of any of solutions 34 to 36, wherein the SRS resource indicator indicating more than one SRS resource is enabled by Radio Resource Control (RRC) signaling, in response to the capability value set supporting the more than one SRS resource, or in response to the more than one SRS resource supporting simultaneous transmissions.

38. The method of solution 29, wherein the DCI signaling comprises an SRS resource set indicator for a codebook-based or a non-codebook-based Physical Uplink Shared Channel (PUSCH) transmission, and wherein the SRS resource set indicator indicates more than one SRS resource set.

39. The method of solution 38, wherein a transmit parameter for the PUSCH transmission or simultaneous PUSCH transmissions is based on the more than one SRS resource set.

40. The method of solution 38, wherein one SRS resource set of the more than one SRS resource set corresponds to a set of precoding information indications, which corresponds to the set of precoding information being shared by the one or more SRS resource set.

41. The method of any of solutions 38 to 40, wherein the SRS resource set indicator indicating more than one SRS resource set is enabled by Radio Resource Control (RRC) signaling, in response to the capability value set supporting the more than one SRS resource sets, or in response to the more than one SRS resource sets supporting simultaneous transmissions.

42. An apparatus for wireless communication comprising a processor, configured to implement a method recited in one or more of solutions 1 to 41.

43. A non-transitory computer readable program storage medium having code stored thereon, the code, when executed by a processor, causing the processor to implement a method recited in one or more of solutions 1 to 41.

Figure 4:
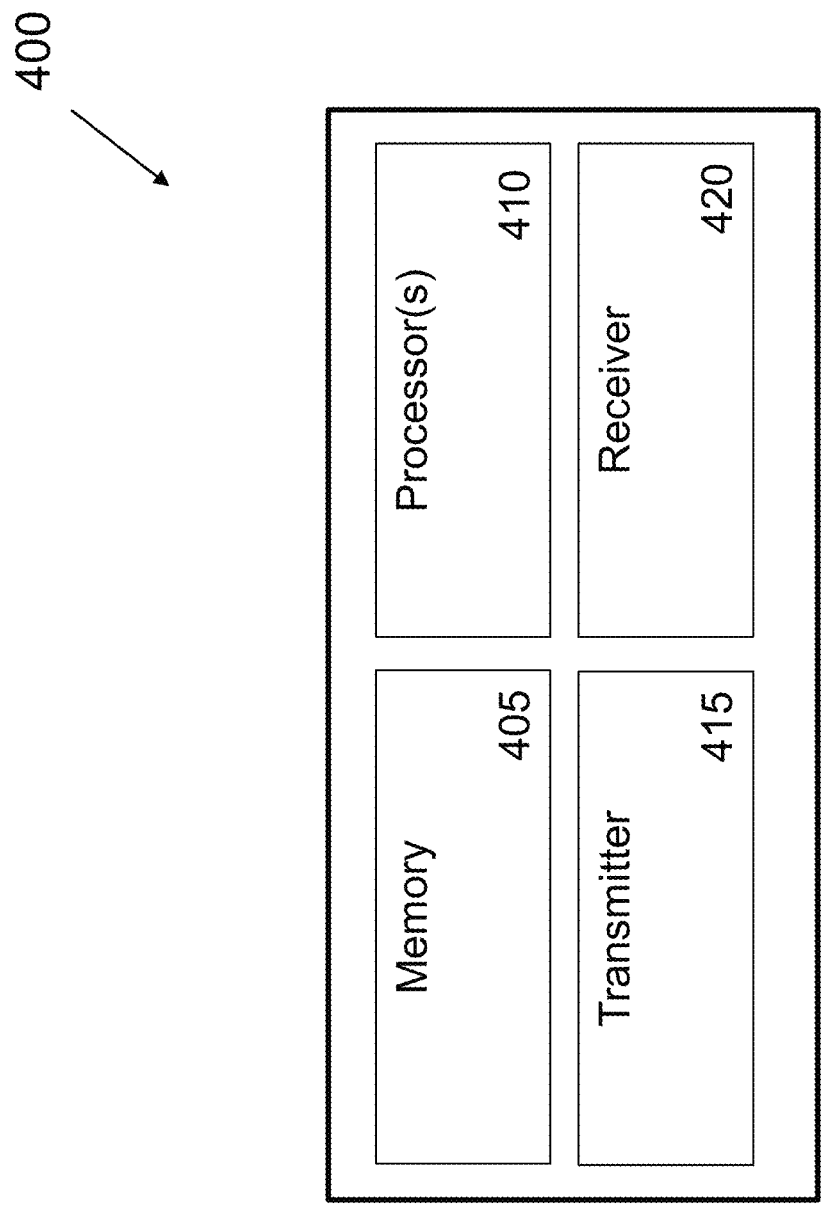
FIG. 4 shows a block diagram of an example hardware platform that may be a part of a network device or a communication device that implements the disclosed technology.
Figure 5:
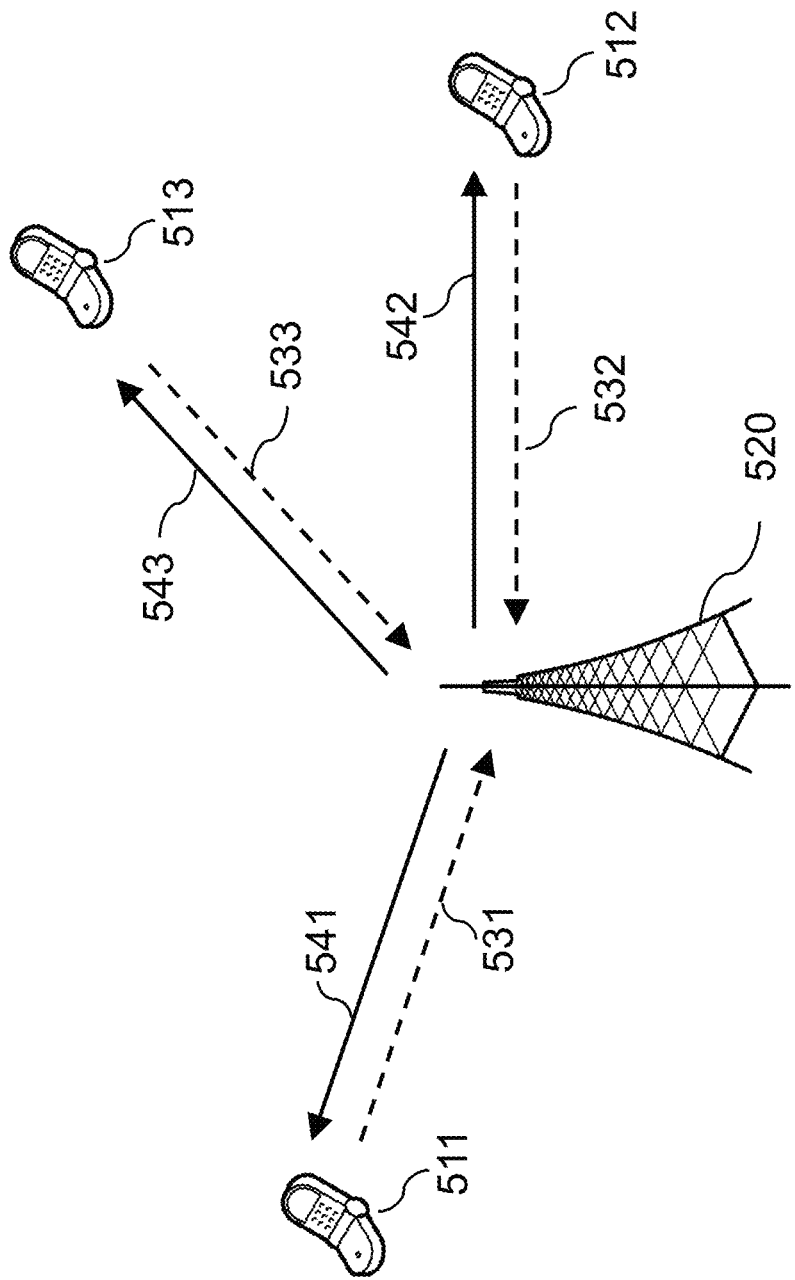
FIG. 5 shows an example of wireless communication including a base station (BS) and user equipment (UE) based on some implementations of the disclosed technology.

FIG. 4 shows an exemplary block diagram of a hardware platform 400 that may be a part of a network device (e.g., base station) or a communication device (e.g., a user equipment (UE)). The hardware platform 400 includes at least one processor 410 and a memory 405 having instructions stored thereupon. The instructions upon execution by the processor 410 configure the hardware platform 400 to perform the operations described in FIGS. 1 to 4 and in the various embodiments described in this patent document. The transmitter 415 transmits or sends information or data to another device. For example, a network device transmitter can send a message to a user equipment. The receiver 420 receives information or data transmitted or sent by another device. For example, a user equipment can receive a message from a network device. The implementations as discussed above will apply to a wireless communication. FIG. 5 shows an example of a wireless communication system (e.g., a 5G or NR cellular network) that includes a base station 520 and one or more user equipment (UE) 511, 512 and 513. In some embodiments, the UEs access the BS (e.g., the network) using a communication link to the network (sometimes called uplink direction, as depicted by dashed arrows 531, 532, 533), which then enables subsequent communication (e.g., shown in the direction from the network to the UEs, sometimes called downlink direction, shown by arrows 541, 542, 543) from the BS to the UEs. In some embodiments, the BS send information to the UEs (sometimes called downlink direction, as depicted by arrows 541, 542, 543), which then enables subsequent communication (e.g., shown in the direction from the UEs to the BS, sometimes called uplink direction, shown by dashed arrows 531, 532, 533) from the UEs to the BS. The UE may be, for example, a smartphone, a tablet, a mobile computer, a machine to machine (M2M) device, an Internet of Things (IoT) device, and so on.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
   determining, by a wireless device, at least one Sounding Reference Signal (SRS) resource set configured by a network node, wherein an SRS resource set of the at least one SRS resource set comprises at least one SRS resource; and
   transmitting, by the wireless device to the network node, a transmission based on the SRS resource set,
   wherein an SRS resource indicator (SRI) corresponding to the SRS resource set is determined based on a phase tracking reference signal (PTRS) port index associated with the at least one SRS resource.

2. The method of claim 1, further comprising:
   reporting, by the wireless device to the network node, at least one capability value set, at least one first parameter, or at least one second parameter,
   wherein one of the at least one first parameter is comprised in or corresponds to one of the at least one capability value set, and
   wherein one of the at least one second parameter corresponds to an uplink (UL) transmission or a scheduling of one or more UL transmissions.

3. The method of claim 1, further comprising:
   receiving, by the wireless device from the network node, at least one capability value set, at least one first parameter, or at least one second parameter,
   wherein one of the at least one first parameter is comprised in or corresponds to one of the at least one capability value set, and
   wherein one of the at least one second parameter corresponds to an uplink (UL) transmission or a scheduling of one or more UL transmissions.

4. The method of claim 2, wherein the at least one SRS resource or the at least one SRS resource set is based on the at least one capability value set.

5. The method of claim 2, wherein one of the at least one capability value set corresponds to one or more SRS resource sets or one or more SRS resources.

6. The method of claim 1, further comprising at least one of:
   reporting, by the wireless device to the network node, (a) at least one indication of the at least one SRS resource set or the at least one SRS resource or (b) at least one indication of a capability value set.

7. The method of claim 6, wherein a maximum number of layers of a Physical Uplink Shared Channel (PUSCH) transmission is determined based on at least one of:
   the at least one indication of the at least one SRS resource set or the at least one SRS resource,
   the at least one indication of a capability value set,
   a number or a maximum number of SRS ports corresponding to the at least one indication of the at least one SRS resource set or the at least one SRS resource,
   a number or a maximum number of SRS ports corresponding to the at least one indication of a capability value set, a number or a maximum number of layers corresponding to the at least one indication of the at least one SRS resource set or the at least one SRS resource, a number or a maximum number of layers corresponding to the at least one indication of a capability value set, a number or a maximum number of layers corresponding to a PUSCH transmission corresponding to (a) the at least one indication of a capability value set or (b) all reported or configured capability value sets.

8. The method of claim 6, wherein one of the at least one indication of the at least one capability value set corresponds to one or a group of reported channel state information-reference signal (CSI-RS) resource indicators (CRI) or SS/PBCH block resource indicators (SSBRI) in one beam reporting.

9. The method of claim 6, wherein one of the at least one indication of the at least one SRS resource set or the at least one SRS resource corresponds to one or a group of reported channel state information-reference signal (CSI-RS) resource indicators (CRI) or SS/PBCH block resource indicators (SSBRI) in one beam reporting.

10. The method of claim 2, wherein the at least one first parameter comprises a parameter corresponding to a capability value set related to the at least one first parameter, and wherein the parameter is at least one of:
a number of SRS resource sets,
a number of SRS resources,
a maximum number of layers of a Physical Uplink Shared Channel (PUSCH) transmission,
a maximum number of one or more SRS resource sets configured or scheduled for a PUSCH transmission,
a maximum number of one or more SRS resources configured or scheduled for a PUSCH transmission,
a number of PTRS ports,
a full power mode indication, or
a coherent type indication.

11. The method of claim 2, wherein the at least one second parameter comprises at least one of:
a number or a maximum number of SRS resource sets,
a number or a maximum number of SRS resources,
a number or a maximum number of layers,
a total number of ports of one or more SRS resources corresponding to a PUSCH transmission,
a maximum number of spatial relations related to one or more SRS resources corresponding to a PUSCH transmission,
a maximum number of transmission configuration indicator (TCI) states related to one or more SRS resources corresponding to a PUSCH transmission, or
a coherent type for an SRS resource or an SRS resource set corresponding to a PUSCH transmission.

12. The method of claim 1, wherein up to a maximum of M0 of the at least one SRS resource set are configured via Radio Resource Control (RRC) signaling, and wherein M0 is an integer.

13. The method of claim 12, wherein up to a maximum of M2 of M0 configured SRS resource sets are indicated via Downlink Control Indication (DCI) signaling, and wherein M2 is an integer less than or equal to M0.

14. The method of claim 12, wherein up to a maximum of M1 of M0 configured SRS resource sets are activated via a Medium Access Control (MAC) Control Element (CE), wherein M1 is an integer less than or equal to M0, and wherein up to a maximum of M2 of M1 activated SRS resource sets are indicated via Downlink Control Indication (DCI) signaling, and wherein M2 is an integer less than or equal to M1.

15. The method of claim 1, wherein:
the at least one SRS resource indicated by the SRI is associated with a same PTRS port index, or
a first PTRS port associated with a first SRS resource indicated by a first SRI is different from a second PTRS port associated with a second SRS resource indicated by a second SRI in response to the first SRI and the second SRI being configured for simultaneous transmission.

16. The method of claim 2, further comprising:
receiving, from the network node, a control information comprising at least one field, wherein a bit size of the at least one field is based on one or more of the at least one first parameter, the at least one second parameter, or the at least one capability value set.

17. The method of claim 16, wherein the control information comprises downlink control information (DCI) signaling, and wherein:
the at least one field comprises an SRS resource set indicator field, and wherein the bit size of the SRS resource set indicator field is set to 1 in response to panel switching being enabled, or
the at least one field comprises an SRI field, wherein the bit size of the SRI field is based on a maximum value across numbers of SRS ports for a first group of SRS resource sets with codebook or non-codebook usage in response to panel switching being enabled, and wherein the first group of SRS resource sets is determined based on (a) the at least one SRS resource set configured by the network node or (b) an indication of the at least one SRS resource set or the at least one SRS resource, or
the DCI signaling excludes more than one SRI field, more than one precoding information, more than one PTRS-demodulation reference signal (DMRS) association, or more than one transmit power control (TPC) command for a scheduled Physical Uplink Shared Channel (PUSCH) in response to panel switching being enabled, or
wherein the bit size of a second SRI field of the more than one SRI field, a second precoding information of the more than one precoding information, a second PTRS-DMRS association of the more than one PTRS-DMRS association, or a second TPC command of the more than one TPC command is zero in response to only panel switching being enabled, or
wherein the DCI signaling comprises another SRI for a codebook-based PUSCH transmission that indicates more than one SRS resource, or
wherein the DCI signaling comprises an SRS resource set indicator for a codebook-based or a non-codebook-based PUSCH transmission, and wherein the SRS resource set indicator indicates more than one SRS resource set.

18. A device for wireless communication, comprising:
a processor in a wireless device configured to:
determine at least one Sounding Reference Signal (SRS) resource set configured by a network node, wherein an SRS resource set of the at least one SRS resource set comprises at least one SRS resource; and
transmit, to the network node, a transmission based on the SRS resource set,
wherein an SRS resource indicator (SRI) corresponding to the SRS resource set is determined based on a phase tracking reference signal (PTRS) port index associated with the at least one SRS resource.

\* \* \* \* \*